United States Patent Office 3,131,186
Patented Apr. 28, 1964

3,131,186
UNSYMMETRICALLY SUBSTITUTED TRIAZINYL ALKYL PHOSPHATES
Richard J. Magee, Princeton, and Frank A. Wagner, Jr., Belle Mead, N.J., assignors to American Cyanamid Company, Stamford, Conn., a corporation of Maine
No Drawing. Filed July 19, 1962, Ser. No. 211,118
6 Claims. (Cl. 260—249.5)

The present invention relates to a new class of unsymmetrically trisubstituted triazinyl compounds. More particularly, the invention relates to new unsymmetrically trisubstituted triazinylalkyl phosphates and to novel methods for their preparation and use.

The novel triazinylalkyl phosphates of this invention are represented by the general formula:

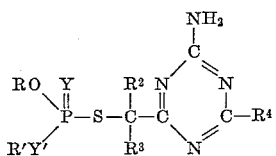

wherein R and R' are lower alkyl, Y and Y' are each oxygen or sulfur, $R^2$ and $R^3$ are each hydrogen or a lower alkyl radical, and $R^4$ represents lower alkyl, phenyl or a lower alkoxy radical.

Illustrative compounds prepared by the process of the invention are:

O,O-dimethyl S-(4-amino-6-phenyl-s-triazin-2-yl) methyl ester of phosphorodithioic acid;
O,O-diethyl S-(4-amino-6-phenyl-s-triazin-2-yl) methyl ester of phosphorodithioic acid;
O,O-diethyl S-1-(4-amino-6-phenyl-s-triazin-2-yl) ethyl ester of phosphorodithioic acid;
O,O-dimethyl S-(4-amino-6-methoxy-s-triazin-2-yl) methyl ester of phosphorodithioic acid;
O,O-dimethyl S-(4-amino-6-methoxy-s-triazin-2-yl) methyl ester of phosphorothioic acid;
O,S-dimethyl S-1-(4-amino-6-phenyl-s-triazin-2-yl) ethyl ester of phosphorodithioic acid;
O,S-diethyl S-(4-amino-6-phenyl-s-triazin-2-yl) methyl ester of phosphorodithioic acid;
O,S-diethyl O-(4-amino-6-propoxy-s-triazin-2-yl) methyl ester of phosphorothioic acid;
and homologs and isomers thereof.

The compounds of the present invention are prepared in a straightforward manner. This is accomplished by reacting substantially equimolar amounts of an ammonium or alkali metal salt of a lower dialkylthiophosphoric acid or a lower dialkyldithiophosphoric acid with a haloalkyl substituted triazine according to the following general reaction:

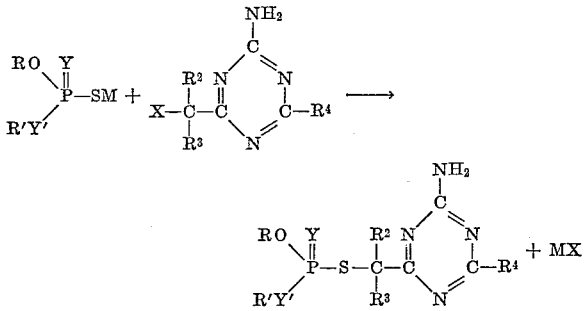

wherein R, R', $R^2$, $R^3$, $R^4$, Y and Y' are radicals as above defined, X represents a halogen radical, such as chloro, bromo or iodo, and M is an alkali metal, such as sodium, potassium, lithium or an ammonium radical.

In general, the acid salts include, for example:

Sodium O,O-dimethyl thiophosphate,
Potassium O,O-dimethyl dithiophosphate,
Lithium O,O-dipropyl thiophosphate,
Ammonium O,O-dipropyl dithiophosphate,
Lithium O,O-diisopropyl thiophosphate,
Sodium O,O-diisopropyl dithiophosphate,
Potassium O-methyl O-ethyl thiophosphate,
Sodium O-methyl O-ethyl dithiophosphate,
Ammonium O-methyl O-propyl thiophosphate,
Potassium O-methyl O-isopropyl dithiophosphate,
Sodium O-methyl S-ethyl dithiophosphate,
Potassium O-methyl S-methyl dithiophosphate, and
Sodium O,S-diethyl dithiophosphate.

Haloalkyl-substituted-amino-s-triazine reactant which conforms to the general formula:

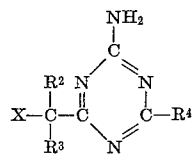

wherein X, $R^2$, $R^3$ and $R^4$ are the same as above defined, is illustrated by each of the following compounds:

2-bromomethyl-4-amino-6-phenyl-s-triazine,
2-chloromethyl-4-amino-6-methyl-s-triazine,
2-(1-bromoethyl)-4-amino-6-ethyl-s-triazine,
2-(1-chloroethyl)-4-amino-6-methoxy-s-triazine,
2-chloromethyl-4-amino-6-phenyl-s-triazine,
2-(1-chloroethyl)-4-amino-6-ethoxy-s-triazine,
2-(1-chloroethyl)-4-amino-6-propoxy-s-triazine, and equivalents thereof.

The halo-alkyl-substituted amino-s-triazine reactant may be prepared in any convenient manner. For instance, a suitable method involves the reaction in acetic anhydride at elevated temperatures between cyanamide and trimethyl orthochloroacetate in equivalent amounts. The so-formed chloromethyl-N-cyanomethylimidate is next reacted with an appropriate amidine in methanol to form a haloalkyl-s-triazine. More specifically, the chloromethylimidate having the formula:

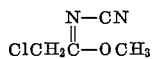

and an amidine:

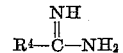

where $R^4$ is alkyl, aryl or alkoxy, such as methyl, phenyl or methoxy, respectively, are reacted in methanol solvent to form the corresponding 2-chloromethyl-4-amino-6-$R^4$-s-triazine wherein $R^4$ is as defined above.

In the preparation of the triazinylalkyl phosphates of the present invention the amounts of reactants employed can be varied widely. However, for optimum operation, usually equimolar quantities are sufficient for reaction. The latter is generally carried out in the presence of an inert organic solvent. Such solvents include, for instance, acetone, methyl isobutyl ketone, alcohol, ether, benzene, chlorinated hydrocarbons and the like. It may be advantageously carried out in the presence of a hydrogen halide acceptor, such as alkali metal carbonate or alkaline earth carbonate.

In general, a wide range of temperatures extending from the freezing point to the decomposition temperature of the reaction mixture may be utilized. However, it is found that the reaction can be advantageously carried out at a temperature in a range of 10° C. to 150° C. and preferably from 20° C. to about 100° C.

The new class of compounds of this invention finds utility as insecticides, by contact, stomach and systemic action, and as acaricides. Such compounds can be employed for insecticidal purposes utilizing methods conventionally employed. For example, they may be applied as spray suspensions or dispersions, as dusts by absorption on an inert finely divided carrier, or as aerosols. Liquid concentrates for dilution with water can also be prepared employing both a compatible organic solvent, such as acetone or xylene, and an emulsifying agent, such as a higher aliphatic alcohol, an alkyl aryl sulfonate, or a higher alkyl sulfonate. Solid carrier materials which can advantageously be used, include talc, kaolinite, various clays and similar inert solid diluents. In addition, the new compounds of this invention can be employed as aerosols by dispersing the same into the atmosphere by means of a compressed halogenated hydrocarbon gas such as dichloro-difluoromethane and equivalents thereof.

The optimum concentration of these compounds to be used with any of the above carriers or methods of application will depend on many factors including the carrier employed, the pest to be controlled, type of surface to be treated, conditions of the application and the particular compound used. In general, however, the compounds of this invention are effective at concentrations of 0.01% to 1% based on the total weight of the composition, although as little as 0.0001% or as much as 5% or even more of the compounds can be employed with good results.

The following detailed examples are presented as illustrative of the preferred embodiments of the practice of the invention. It is understood that they are not to be taken as limitative thereof.

EXAMPLE 1

*O,O-Dimethyl S-(4-Amino-6-Phenyl-s-Triazin-2-Yl) Methyl Ester of Phosphorodithioic Acid*

A solution of 1.96 parts of potassium O,O-dimethyl phosphorodithioate and 2.20 parts of 2-chloromethyl-4-amino-6-phenyl-s-triazine in 50 parts of anhydrous acetone is stirred overnight at room temperature and filtered, yielding 85% of theory of potassium chloride. The solvent is removed from the filtrate, under reduced pressure, and the residual oil is then taken up in 100 parts of ether. The ethereal solution is washed with a total of 15 parts of water, treated with decolorizing charcoal, dried over magnesium sulfate, filtered and the solvent removed under reduced pressure to yield 83% of theory of solid crude product. Recrystallizations from benzene-hexane and aqueous alcohol yield the analytically pure product in 50% yield as colorless crystals having a melting point equal to 97.0° C. to 98.0° C.

EXAMPLE 2

*O,O-Dimethyl S-(4-Amino-6-Methoxy-s-Triazin-2-Yl) Methyl Ester of Phosphorodithioic Acid*

The procedure of Example 1 is followed using 9.81 parts of potassium O,O-dimethyl phosphorodithioate and 8.43 parts of 2-chloromethyl-4-amino-6-methoxy-s-triazine in 150 parts of acetone. After overnight stirring, the mixture is heated to reflux for one hour and filtered, yielding 78% of theory of potassium chloride. Several recrystallizations from chloroform, benzene, chloroform ether and methanol yield analytically pure, colorless crystals at 25% yield having a melting point equal to 128.0° C. to 129.0° C.

EXAMPLE 3

*O,O-Dimethyl S-(4-Amino-6-Ethoxy-s-Triazin-2-Yl) Methyl Ester of Phosphorothioic Acid*

Repeating the procedure of Example 2 in every detail, except that sodium O,O-dimethyl phosphorothioate is employed in lieu of said phosphorodithioate and 2-chloromethyl-4-amino-6-ethoxy-s-triazine is substituted for the s-triazine of that example, a good yield of O,O-dimethyl S-(4-amino-6-ethoxy-s-triazin-2-yl) methyl ester of phosphorothioic acid is obtained.

EXAMPLE 4

*O,O-Dimethyl S-1-(4-Amino-6-Methoxy-s-Triazin-2-Yl) Ethyl Ester of Phosphorodithioic Acid*

As in the procedure of Example 2 above, 2.5 parts of potassium O,O-dimethyl phosphorodithioate and 2.8 parts of 2-(1-bromoethyl)-4-amino-6-methoxy-s-triazine are admixed in 65 parts (by volume) of anhydrous acetone. After refluxing for two hours, resultant product is recrystallized from chloroform and recovered in 30% yield as colorless crystals.

EXAMPLE 5

In a similar fashion O,O-diethyl S-(4-amino-6-methyl-s-triazin-2-yl)methyl ester of phosphorodithioic acid is prepared as in Example 4 above, except that 2-(1-chloromethyl)-4-amino-6-methyl-s-triazine and potassium O,O-diethyl phosphorodithioate are employed.

Compounds prepared in accordance with the practice of the invention find utility as insecticides. To demonstrate their potency, 0.01%, 0.001% and 0.0001% solutions of the active compound in 65% acetone and 35% water are prepared and sprayed on nasturtium plants infested with aphids (asphis rumicis). The results are tabulated in Table I below.

TABLE I

| Example | Product | Percent Kill Aphids | | |
|---|---|---|---|---|
| | | .01 | .001 | .0001 |
| 1 | (CH₃O)₂P(S)—SCH₂—[4-amino-s-triazin-2-yl] | 64 | 64 | |
| 2 | (CH₃O)₂P(S)—SCH₂—[4-amino-6-OCH₃-s-triazin-2-yl] | 100 | 100 | 98 |
| 3 | (CH₃O)₂P(O)—S—CH₂—[4-amino-6-OC₂H₅-s-triazin-2-yl] | 100 | 95 | 90 |
| 4 | (CH₃O)₂P(S)—SCH(CH₃)—[4-amino-6-OCH₃-s-triazin-2-yl] | 100 | 90 | 90 |
| 5 | (C₂H₅O)₂P(S)—SCH₂—[4-amino-6-CH₃-s-triazin-2-yl] | 10 0 | 60 | |

We claim:
1. Unsymmetrically trisubstituted triazinyl alkyl phosphate ester of the formula:

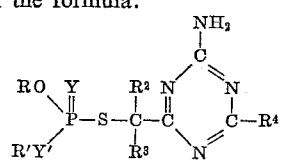

wherein R and R' are each a lower alkyl radical, $R^2$ and $R^3$ each represent a radical selected from the group consisting of hydrogen and lower alkyl, Y and Y' each represent an atom selected from the group consisting of oxygen and sulfur, and $R^4$ represents a radical selected from the group consisting of lower alkyl, lower alkoxy and phenyl.

2. O,O-dimethyl S-(4-amino - 6 - phenyl-s-triazin-2-yl) methyl ester of phosphorodithioic acid.

3. O,O-dimethyl S-(4-amino - 6 - methoxy-s-triazin-2-yl) methyl ester of phosphorodithioic acid.

4. O,O-dimethyl S-(4-amino - 6 - ethoxy-s-triazin-2-yl) methyl ester of phosphorothioic acid.

5. O,O-dimethyl S-1-(4-amino - 6 - methoxy-s-triazin-2-yl) ethyl ester of phosphorodithioic acid.

6. O,O-diethyl S-(4-amino - 6 - methyl-s-triazin-2-yl) methyl ester of phosphorodithioic acid.

References Cited in the file of this patent

UNITED STATES PATENTS

| | | |
|---|---|---|
| 2,210,831 | Bock et al. | Aug. 6, 1940 |
| 2,513,264 | Holm-Hansen | June 27, 1950 |
| 2,736,726 | Gaetzi et al. | Feb. 28, 1956 |
| 2,980,675 | Schwarze | Apr. 18, 1961 |

FOREIGN PATENTS

| | | |
|---|---|---|
| 572,314 | Belgium | Apr. 23, 1959 |
| 552,660 | Canada | Feb. 4, 1958 |